Figure 1:
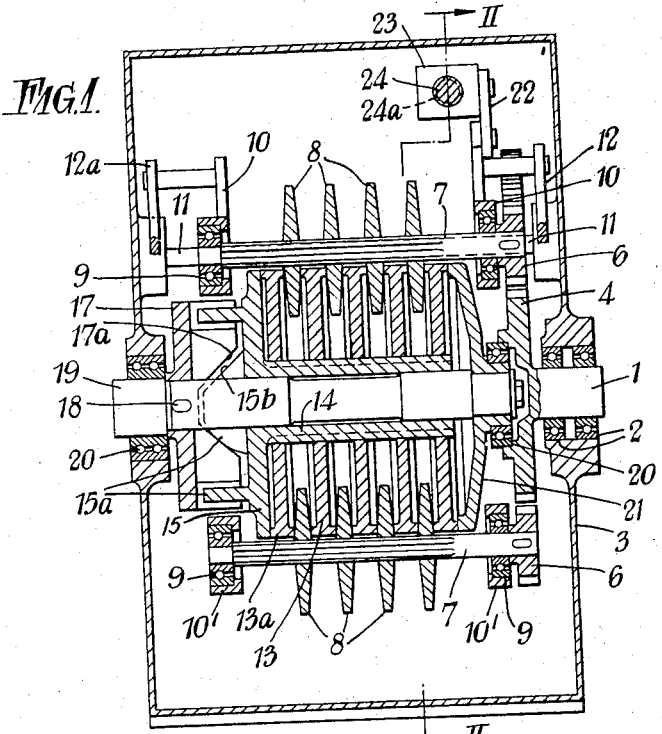

INVENTOR,
JOSEF BEIER, DECEASED,
BY HANS HERBERT BEIER,
ALICE BEIER,
REGINE BEIER,
HEIRS

By Karl W. Flocks
Attorney

United States Patent Office 2,880,623
Patented Apr. 7, 1959

2,880,623

VARIABLE FRICTION GEARS

Josef Beier, deceased, late of Sarnen, Kalton, Obwardon, Switzerland, by Hans Herbert Beier, Boldon, and Alice Beier and Regine Beier, Karlsruhe, Germany, heirs Application July 24, 1956, Serial No. 610,431

Claims priority, application Germany July 27, 1955

17 Claims. (Cl. 74—190.5)

This invention relates to improvements in a variable friction gear and is particularly concerned with improvements in a gear of the kind (hereinafter referred to as being of the "kind specified") comprising a first shaft carrying friction discs, at least one second shaft extending substantially parallel with the first shaft and spaced radially therefrom and carrying friction discs intermeshing with those of the first shaft and means for moving said second shaft or shafts relative to said first shaft in a radial direction to vary the extent to which the discs intermesh and thus to vary the gear ratio.

In gears of the kind specified, as hitherto proposed, the means for moving the second shaft or shafts is utilised to adjust the position of the second shaft or shafts relative to and radially of the first shaft to set up the gear to a selected ratio and once this is done the relative position of the shafts is fixed. In the use of such gears, however, the driven speed tends to fall as the load increases due to slip occurring between the friction discs and this is a disadvantage, as compared with positively engaging variable speed gears, in many applications where it is desirable that the driven speed should be maintained at a selected value independently of the load.

It is an object of the present invention to provide a gear of the kind specified which shall be capable of maintaining a selected driven speed at a substantially constant value independently of the load.

According to the present invention in a friction gear of the kind specified the position of the second shaft or shafts relative to the first shaft and hence the extent to which the discs intermesh is automatically adjustable in accordance with the magnitude of the load to vary the gear ratio in the sense to oppose the effect on the driven speed of slip between the intermeshing discs.

Preferably spring means is provided to oppose said automatic adjustment.

Advantageously the spring means is arranged to have a predetermined characteristic whereby the variation of the gear ratio is controlled as a predetermined function of the load, and preferably to be such that the controlled variation of the gear ratio substantially balances the effect of slip between the discs due to the load to maintain the driven speed substantially constant at a selected value.

Conveniently the characteristic of the spring means is adjustable in accordance with the gear ratio selected under idling or no load conditions.

In a preferred embodiment of the invention a friction gear of the kind specified comprises two or more second shafts equiangularly disposed about and equidistantly spaced from the axis of the first shaft, a linkage system connecting said second drafts to the means for moving the latter to a selected position to select the gear ratio under idling or no load conditions, friction discs formed with flanged or thickened rims carried on the first shaft to be axially movable thereon but non-rotatable with respect thereto, shallow conical friction discs carried on the second shafts to be axially movable thereon but non-rotatable with respect thereto, pressure means arranged to exert an axial pressure on the flanged discs in accordance with the load, thereby tending automatically to force the conical discs outwards with increasing load to increase the gear ratio to compensate at least in part for increasing slip between the friction discs due to increase in load, and spring means arranged to oppose such automatic outward movement of the conical discs and the associated second shafts.

Advantageously, the means for moving the second shafts comprises two parts movable relative to each other to adjust the position of the second shafts relative to the first shaft to select the gear ratio under no load conditions and said two parts are movable together against the effect of said spring means as said second shafts move radially outwards due to increasing load.

Figure 2:
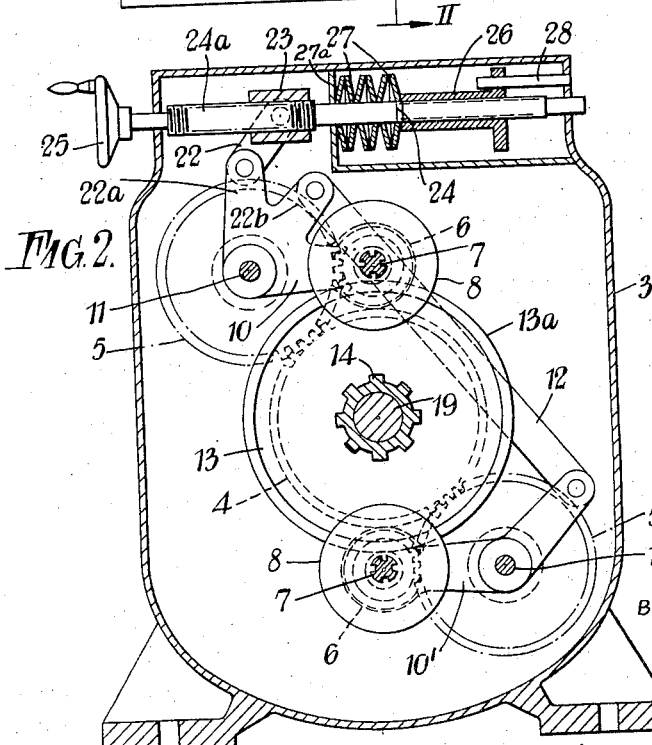

One embodiment of the invention will now be described by way of example with reference to the accompanying drawings in which:

Fig. 1 is a vertical section through a friction gear according to the invention, and Fig. 2 is a section taken on the line II—II of Fig. 1.

In the example illustrated in Figs. 1 and 2 the gear is an infinitely variable change speed gear having shallow conical friction elements, the basic construction of the gear being already known, for example from U.S. Patent No. 2,743,621.

The gear is driven through a driving shaft 1, which is mounted in bearings 2 in the gear casing 3.

The driving shaft 1 carries a driving wheel 4 fixed thereon through which the drive is transmitted to two toothed wheels 5 which are mounted to rotate freely on rocker pins 11. The drive is transmitted from each toothed wheel 5 to a gear wheel 6, the gear wheels 6 being each mounted on a shaft 7. The shafts 7 are formed with axial key-ways and each carries a number of shallow conical friction discs 8 which are movable axially on the associated shaft 7 but are non-rotatably relative thereto due to the axial key-ways. The shafts 7 are mounted for rotation in bearings 9 which are themselves carried in rocker forks 10 and 10'. The rocker forks 10 and 10' may be rocked about the rocker pins 11 which are mounted in the gear casing 3 in order to vary the gear or transmission ratio. In order that rocking movement of the forks 10 and 10' is always carried out to the same extent for both forks, the latter are coupled by a linkage system including a coupling rod 12.

The shallow conical friction discs 8 intermesh with friction discs 13 having a flanged or thickened rim 13a the operative faces of which are ground to substantially the same slope as the adjacent faces of the conical friction discs 8. The flanged discs 13 are carried by and keyed on to a centrally disposed hollow shaft 14 so as to be axially movable thereon but non-rotatable relative thereto. The shafts 7 are disposed equiangularly about and equidistantly from the axis of the hollow shaft 14 and it will be appreciated that more than two such shafts 7 with the associated gear wheels 6 and conical friction discs 8 may be provided.

A front pressure plate 15 is formed integrally with the shaft 14 and carries projections 15a having cam surfaces 15b which co-operate with corresponding surfaces 17a carried on a cam member 17 which is fixed by keyways 18 on to a driven shaft 19 which extends through the shaft 14 and is mounted in bearings 20 carried at one end in the casing 3 and at the other end in the driving wheel 4. The front pressure plate 15 bears against one end of the stack of friction discs 13 and a rear pressure plate 21 is carried on the shaft 19 to bear against the opposite end of the stack.

The friction discs 8 and 13 may either dip into an oil bath or be washed with oil, the oil serving to maintain the discs reasonably cool and to provide a film between the operative faces of the discs through which the drive is transmitted.

The gear is set to a predetermined gear ratio and to a selected driven speed under idling or no load conditions by an adjustment mechanism which adjusts the degree to which the conical discs 8 intermesh with the flanged discs 13 by rocking the rocker forks 10 and 10' about the rocker pins 11 and hence controlling the radial position of the shafts 7 with respect to the central shaft 14. The adjustment mechanism comprises a link 22 connected to one arm 22a of a three armed lever the second arm 22b of which is connected to the coupling rod 12 and the third arm of which constitutes one of the rocker forks 10 connected to one of the shafts 7, an adjusting nut 23 to which the link 22 is also connected, a spindle 24 carrying a worm 24a which is engaged by the nut 23, and a handwheel 25. An abutment is provided on the spindle 24 by a threaded collar 26 which threadedly engages the spindle 24 and plate springs 27 are provided surrounding the spindle 24 and abutting at one end against a fixed abutment 27a secured to the casing 3 and at the other end against the collar 26 so as to tend to urge the spindle 24 to the right as seen in Fig. 2, the spindle 24 being carried in the casing 3 in such manner as to permit it to move axially. A guide pin 28 is provided to engage the collar 26 to prevent the latter rotating when the spindle 24 is rotated by the hand wheel 25. The three armed lever is carried on one of the rocker pins 11 and may be keyed thereon to rotate the latter in accordance with the rotation of the three-armed lever, this rotation being transmitted to the other rocker fork 10 keyed on to the other end of the rocker pin 11 and through a further coupling rod 12a to the other rocker fork 10' so that both ends of the shafts 7 and both the shafts 7 are rocked to the same degree.

In the operation of the gear described the drive is transmitted through the driving shaft 1, the driving wheel 4, the toothed wheels 5, gear wheels 6, shafts 7, conical discs 8, flanged discs 13, projections 15a, cam surfaces 15b, cam surfaces 17a, and cam member 17 to the driven shaft 19. The transmission ratio under no load conditions and hence the idling speed of the driven shaft 19 is selected by rotation of the hand wheel 25 which rotates the spindle 24 and worm 24a to adjust the position of the nut 23 thereon and hence through the linkage system which includes the link 22, coupling rod 12 and rocker forks 10 and 10', the position of the shafts 7 relative to the shaft 14 and hence the degree to which the discs 8 and 13 intermesh. The characteristic of the plate springs 27 is varied in accordance with the selected idling speed either by withdrawing the guide pin 28 and adjusting the position of the collar 26 on the spindle 24 or by leaving the guide pin 28 in position to hold the collar 26 against rotation as the spindle is rotated so that the axial position of the collar 26 on the spindle 24 and hence the characteristic of the springs 27 is simultaneously varied with the selected idling speed as the spindle 24 is rotated by the hand wheel 25. When the idling speed has been selected the driven shaft 19 is connected to the load and this produces a back pressure between the cam surfaces 15b and 17a which urge the pressure plate 15 against the one end of the stack of flanged discs 13 with a pressure which is a function of the load, the rear pressure plate 21 being fixed against axial movement on the shaft 19. This causes the flanged discs 13 to exert a similar pressure on the conical discs 8 and by virtue of the inclinations of the operative surfaces of these discs the conical discs 8 tend to be squeezed outwards from the flanged discs 13 thus tending to increase the transmission ratio of the gear. The outward movement of the discs 8 is transmitted through the linkage system to the nut 23, worm 24a and spindle 24 causing these to move axially together, to the left as seen in Fig. 2, against the effect of the plate springs 27. Thus the springs 27 control the outward movement of the discs 8 under the influence of the load so that by selecting the characteristic of the spring 27 the automatic increase in the transmission ratio due to increase in load may be made a predetermined function of the increase in load. Due to the increase in the load slip occurs between the friction discs 8 and 13 and it will be seen that the effect of this slip on the driven speed is compensated for, at least in part, by the automatic increase in the transmission ratio of the gear. By suitably selecting the characteristic of the springs 27 the automatic increase in the transmission ratio of the gear may be made to substantially balance out the effect of slip on the driven speed so that the latter may be maintained at a substantially constant value independently of the load.

It will be appreciated that the construction of the friction gear described may be varied from that described with reference to Figs. 1 and 2 without departing from the scope of the invention, the essential requirement being that the transmission ratio should vary in accordance with the load in the sense to oppose the effect on the driven speed of slip occurring in the gear.

It will be further appreciated that the adjustment mechanism may be modified.

What is claimed is:

1. A speed changing frictional power transmission comprising a first set of friction wheel means mounted for concurrent rotation upon a common axis, said set being axially expansible and contractible, a second set of friction wheel means mounted for concurrent rotation about a second common axis parallel with, but offset from, said first-named axis, said second set being axially expansible and contractible and having its several wheel means in intermeshing driving engagement with the wheel means of said first set, said second common axis being movable toward and away from said first-named axis to vary the driving ratio between said sets of friction wheel means, a drive shaft, means connecting said drive shaft to rotate one of said sets of wheel means, means for connecting the other of said sets to drive a load, means responsive to increase in such a load to exert a contractive force upon one of said sets, thus tending to shift said second common axis in a direction tending to increase the speed at which said other set is driven by said one set, and means resiliently resisting such shifting of said second common axis.

2. In a device of the class described, a first shaft, a set of axially-separated, rim-thickened friction wheel means mounted on said shaft for rotation therewith, certain of said wheel means being axially shiftable relative to each other, a second shaft axially parallel with said first shaft and movable toward and away from said first shaft, a set of axially-separated, double-coned friction wheel means mounted on said second shaft for rotation therewith in frictional intermeshing engagement with the wheel means of said first set, certain of the wheel means of said second set being axially shiftable relative to each other, means for driving said second shaft, means for connecting said first shaft to a load including means responsive to load variations to exert a variable contractive force upon said wheel means, and means for shifting said second shaft toward and away from said first shaft, said last-named means including cam means operatively connected to move said second shaft toward and away from said first shaft and comprising an element rotationally adjustable to effect such movement, said element being mounted for bodily movement as well as for such rotational adjustment, and spring means bearing on said element and resiliently resisting bodily movement thereof in a direction responsive to such contractive force.

3. In a device of the class described, a first shaft, a set of axially-separated, rim-thickened friction wheel means mounted on said shaft for rotation therewith, certain of said wheel means being axially shiftable relative to each other, a second shaft axially parallel with said first shaft and movable toward and away from said first shaft, a set of axially-separated, double-coned friction wheel means mounted on said second shaft for rotation therewith in frictional, intermeshing engagement with the wheel means of said first set, certain of the wheel means of said second set being axially shiftable relative to each other, means for driving said second shaft, means for connecting said first shaft to a load including means responsive to load variations to exert a variable contractive force upon said wheel means, and means for shifting said second shaft toward and away from said first shaft, said last-named means including a screw shaft mounted for axial reciprocation and for rotation about its own axis, a nut threadedly mounted on said screw shaft and held against rotation therewith, link means connecting said nut to move said second shaft toward and away from said first shaft upon opposite movement of said nut in the direction of the axis of said screw shaft, and spring means resiliently urging said screw shaft axially in a direction to move said second shaft toward said first shaft.

4. The device of claim 3 including means providing an adjustable connection between said screw shaft and said spring means for selectively varying the effective force of said spring means.

5. A speed changing frictional power transmission comprising a first shaft having a set of axially displaceable friction members non-rotatably centrally secured thereon, a second shaft parallel to said first shaft having a set of axially displaceable friction members non-rotatably centrally secured thereon and intermeshing with the set on said first shaft, means supporting said second shaft for movement toward and away from said first shaft, means yieldingly opposing movement of said second shaft away from said first shaft, a drive shaft drivingly connected to said second shaft in any position thereof, and a driven shaft drivingly connected with said first shaft, said means supporting said second shaft comprising a rocker fork having one arm supporting said second shaft, an axially shiftable threaded control shaft, means supporting said control shaft for rotation, a nut threaded on said control shaft, means for holding said nut against rotation with said control shaft, means connecting said nut with said fork to thereby rock said fork upon rotation of said control shaft, a second nut on said control shaft, means for holding said second nut against rotation with said control shaft, said means yieldingly opposing movement of said second shaft comprising a spring abutting against said second nut.

6. The transmission in accordance with claim 5, in which said holding means for said second nut is withdrawable to permit adjustment of the position of said second nut on said control shaft while said control shaft is stationary.

7. The transmission in accordance with claim 1 and comprising means to adjust the position of said second common axis with respect to said first common axis.

8. The transmission in accordance with claim 7 and comprising means to adjust the degree of resilient resistance of said means yieldingly opposing movement of said second shaft operatively connected with said position-adjusting means for simultaneous movement therewith.

9. The transmission in accordance with claim 1, said means supporting said second common axis comprising a rocker fork having one arm supporting said second common axis, a threaded control shaft, means supporting said control shaft for rotation, a nut threaded on said control shaft, and means connecting said nut with said fork to thereby rock said fork upon rotation of said control shaft.

10. A speed changing frictional power transmission comprising a first shaft having a set of axially displaceable friction members non-rotatably secured thereon, a second shaft parallel to said first shaft having a set of axially displaceable friction members non-rotatably secured thereon and intermeshing with the set on said first shaft, means supporting said second shaft for movement toward and away from said first shaft, means yieldingly opposing movement of said second shaft away from said first shaft, a drive shaft, means drivingly connecting said drive shaft to said second shaft in any position thereof, a driven shaft, and means connecting said first shaft with said driven shaft and responsive to an increase in the torque on said driven shaft to urge the friction members on said first shaft more strongly toward each other.

11. A speed changing frictional power transmission comprising a first shaft having a set of axially displaceable friction members non-rotatably secured thereon, a second shaft parallel to said first shaft having a set of axially displaceable friction members non-rotatably secured thereon and intermeshing with the set on said first shaft, means supporting said second shaft for movement toward and away from said first shaft, means yieldingly opposing movement of said second shaft away from said first shaft, a drive shaft, means drivingly connecting said drive shaft to said second shaft in any position thereof, a driven shaft, and axially movable cam means connecting said first shaft with said driven shaft and urging the members of said first shaft together.

12. A speed changing frictional power transmission comprising a first shaft having a set of axially displaceable friction members non-rotatably secured thereon, a second shaft parallel to said first shaft having a set of axially displaceable friction members non-rotatably secured thereon and intermeshing with the set on said first shaft, means supporting said second shaft for movement toward and away from said first shaft, means yieldingly opposing movement of said second shaft away from said first shaft, a drive shaft, means drivingly connecting said drive shaft to said second shaft in any position thereof, a driven shaft, a pressure plate abutting an end member of the set of members on said first shaft and axially movable relative to said members, and cam means connecting said driven shaft to said first shaft and urging said pressure plate toward said members upon an increase in torque of said driven shaft.

13. A speed changing frictional power transmission comprising a first shaft having a set of axially displaceable friction members non-rotatably secured thereon, a second shaft parallel to said first shaft having a set of axially displaceable friction members non-rotatably secured thereon and intermeshing with the set on said first shaft, means supporting said second shaft for movement toward and away from said first shaft, means yieldingly opposing movement of said second shaft away from said first shaft, a drive shaft, means drivingly connecting said drive shaft to said second shaft in any position thereof, a driven shaft, a pressure plate non-rotatably connected to said first shaft and axially movable with respect to the members on said first shaft, a first cam having a spiral surface and connected with said driven shaft, a second cam having a spiral surface in operative engagement with the spiral surface of said first cam non-rotatably connected with said first shaft and connected with said pressure plate for axial movement therewith.

14. A speed changing frictional power transmission comprising a first shaft, a first pressure plate connected with said first shaft for movement therewith, a second pressure plate, means rotatably supporting said second pressure plate, means supporting said first shaft and said first pressure plate for rotational and axial movement, a plurality of axially spaced friction discs between said pressure plates and spline-connected to said first shaft, a first cam surface on the side of said first pressure plate opposite to said friction discs having circumferential and axial extent, a driven shaft, a second cam surface secured to said driven shaft having circumferential and axial extent and engaging with said first cam surface, a second shaft, means supporting said second shaft for rotation and for movement between positions parallel to said first shaft but at varying distances therefrom, a plurality of friction discs spline-connected with said second shaft and intermeshing with the discs of said first shaft, means yieldingly opposing movement of said second shaft away from said first shaft, a drive shaft, and means drivingly connecting said drive shaft to said second shaft in any position thereof.

15. The transmission in accordance with claim 14, said means supporting said second shaft comprising a rocker fork having one arm supporting said second shaft, a threaded control shaft, means supporting said control shaft for rotation, a nut threaded on said control shaft, and means connecting said nut with said fork to thereby rock said fork upon rotation of said control shaft.

16. The transmission in accordance with claim 15, in which said control shaft is axially shiftable, and including a second nut on said control shaft, means for holding said second nut against rotation with said control shaft, said means yieldingly opposing movement of said second shaft comprising a spring abuttting against said second nut.

17. The transmission in accordance with claim 16, in which said holding means for said second nut is withdrawable to permit adjustment of the position of said second nut on said control shaft while said control shaft is stationary.

References Cited in the file of this patent

UNITED STATES PATENTS

| 2,222,281 | Beier | Nov. 19, 1940 |
| 2,787,164 | Meyer | Apr. 2, 1957 |
| 2,794,346 | Frost | June 4, 1957 |

FOREIGN PATENTS

| 666,092 | France | May 14, 1929 |